(12) United States Patent
Klassen et al.

(10) Patent No.: US 8,325,394 B2
(45) Date of Patent: Dec. 4, 2012

(54) HIERARCHICAL SCANNER CHARACTERIZATION

(75) Inventors: R. Victor Klassen, Webster, NY (US); Stephen C. Morgana, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 370 days.

(21) Appl. No.: 12/789,766

(22) Filed: May 28, 2010

(65) Prior Publication Data

US 2011/0292477 A1 Dec. 1, 2011

(51) Int. Cl.
*H04N 1/04* (2006.01)
(52) U.S. Cl. ......... 358/505; 358/1.9; 358/525; 358/1.12
(58) Field of Classification Search .......... 358/505, 358/1.9, 525, 1.12, 1.5, 518
See application file for complete search history.

(56) References Cited

U.S. PATENT DOCUMENTS

| | | | |
|---|---|---|---|
| 6,335,800 B1* | 1/2002 | Balasubramanian | 358/1.9 |
| 6,870,636 B2* | 3/2005 | Kulkarni | 358/1.9 |
| 7,295,703 B2 | 11/2007 | Bala et al. | |
| 2004/0096102 A1 | 5/2004 | Handley | |
| 2005/0281459 A1 | 12/2005 | Bala et al. | |
| 2006/0227386 A1 | 10/2006 | Nuuja et al. | |
| 2007/0103707 A1 | 5/2007 | Klassen | |
| 2007/0146742 A1 | 6/2007 | Klassen | |

OTHER PUBLICATIONS

V. Ostromoukhov, R.D. Hersch, C. Péraire, P. Emmel, I. Amidror, "Two approaches in scanner-printer calibration: colorimetric space-based vs. closed-loop" in proc. SPIE 2170, pp. 133-142 1994.

Hardeberg, J. Hardeberg, "Desktop Scanning to sRGB" in IS&T and SPIE's Device Independent Color, Color Hardcopy and Graphic Arts V, San Jose, Calif. (Jan. 2000).
Haneishi et al., H. Haneishi, T. Hirao, A. Shimazu, and Y. Miyake, "Colorimetric precision in scanner calibration using matrices", in Proceedings of IS&T and SID's 3rd Color Imaging Conference: Color Science, Systems and Applications, pp. 106-108, Scottsdale, Ariz. (Nov. 1995).
Rao, A. R. Rao, "Color calibration of a colorimetric scanner using non-linear least squares", in Proc. IS&T's 1998 PICS Conference, Portland, Oreg. (May 1998).
J. Hardeberg, Acquisition and Reproduction of Colour Images: Colorimetric and Multispectral Approaches, Doctoral Dissertation, l'Ecole Nationale Superieure des Telecommunications (Paris 1999).
H. Kotera, A Ishige, H-S Chen and R. Saito "High Precision scanner/printer calibrations in sub-divided color spaces", *Journal of Imaging Science and Technology*, vol. 43, No. 2, Mar./Apr. 1999.

* cited by examiner

*Primary Examiner* — Houshang Safaipour
(74) *Attorney, Agent, or Firm* — Fay Sharpe LLP

(57) ABSTRACT

A system and method of scanner characterization is provided which establishes an accurate relationship between a scanner's device-dependent (scanner) color space and a device-independent colorimetric space. A hierarchical subdivision of device-dependent color space into sub-regions is performed. The sub-regions are defined by cutting planes dividing patch color values in device-dependent color space perpendicular to principal axes. A color transformation matrix is then generated establishing the relationship between the scanner device-dependent color space and the device-independent color space for each sub-region of device-dependent color space using the patch color values and a weighting function for each matrix. Each weighting function gives a weight to each patch color value which is a function of the location of the patch color value with respect to the cutting planes defining the sub-region containing the patch color value.

20 Claims, 9 Drawing Sheets

HIERARCHICAL SCANNER CHARACTERIZATION

BACKGROUND

Disclosed herein are embodiments of color scanner characterization, and more particularly, to systems and methods of performing a hierarchical subdivision of color space into sub-regions using principal component analysis to find axes of greatest variance in an input color set and generating a color transformation matrix for each sub-region using a weighting function.

Scanner characterization establishes the relationship, or mapping, between a scanner's device-dependent (scanner) color space and a device-independent colorimetric space, such as International Commission on Illumination CIE-XYZ color space. It is desirable to achieve very high accuracy scanner characterization.

Others have performed scanner characterization (sometimes called calibration) experiments. Ostromoukhov et al obtained results of 2.37 mean ΔE, in V. Ostromoukhov, R. D. Hersch, C. Péraire, P. Emmel, I. Amidror, "Two approaches in scanner-printer calibration: colorimetric space-based vs. closed-loop" in proc. SPIE 2170, pp. 133-142 1994. They noticed neighborhood effects, and attempted to reduce their impact by using large patches. Reduced accuracy in their results appear to be due to integrating cavity effect.

Hardeberg, J. Hardeberg, "Desktop Scanning to sRGB" in IS&T and SPIE's Device Independent Color, Color Hardcopy and Graphic Arts V, San Jose, Calif. (January 2000), optimized a third order (3×20) matrix, obtaining mean ΔE of 1.4 on two scanners, with less good results on others.

Previously, Haneishi et al., H. Haneishi, T. Hirao, A. Shimazu, and Y. Miyake, "Colorimetric precision in scanner calibration using matrices", in Proceedings of IS&T and SID'S 3rd Color Imaging Conference: Color Science, Systems and Applications, pp. 106-108, Scottsdale, Ariz. (November 1995), had obtained mean ΔE=2 using a second (3×10) matrix regression. Rao, A. R. Rao, "Color calibration of a colorimetric scanner using non-linear least squares", in Proc. IS&T's 1998 PICS Conference, Portland, Oreg. (May 1998), obtained similar values.

Hardeberg's thesis, J. Hardeberg, Acquisition and Reproduction of Colour Images: Colorimetric and Multispectral Approaches, Doctoral Dissertation, l'Ecole Nationale Superieure des Telecommunications (Paris 1999), describes an experiment (p. 37ff.) in which a single scanner is characterized with a mean ΔE of 0.92, a max of 4.67 and a 95th percentile of 2.25 on a set of 288 patches (the same set used to calibrate). He also characterized and tested on (disjoint) subsets (p. 51), and found that when he used 144 patches to train, and the other 144 to test, the mean ΔE rose to 0.96, but the max (of the test set) fell to 3.36 (the max ΔE for the training set was higher, at 3.9).

From a purely numerical, quality-of-fit standpoint, one of the best yet is described by Kotera, et al. in H. Kotera, A Ishige, H-S Chen and R. Saito "High Precision scanner/printer calibrations in sub-divided color spaces", *Journal of Imaging Science and Technology*, Volume 43, number 2, March/April 1999. Kotera et al described experiments in which multiple (non-hierarchical) subdivisions of space, with no smooth transitioning across boundaries were tried. Regions were selected to have nearly identical numbers of input points within them. Their best results, with a cubic matrix, were 0.35 (RMS) and 1.58 (max). Kotera used only 240 input points, and then divided the input points spatially into 8 equal sized groups of about 30 points per group. The measure of quality is fit quality, that is, the difference between the input points and the fit evaluated at those inputs. Had Kotera increased the division to 12 groups averaging 20 points per group, the fit would have been perfect, since the number of points would be practically the same as the number of parameters (20 per separation). Kotera's subdivision of space was one of three forms based on simple divisions of L*a*b* space. The best results reported were for L*-C* division, where concentric shells of similar chroma were divided up by luminance. Kotera minimized the error between tristimulus (XYZ) values and RGB values converted through the fit matrix to tristimulus values.

It is desirable to provide scanner characterization that is accurate while providing a smooth transition between regions of color space using different matrices.

BRIEF DESCRIPTION

Systems and methods of scanner characterization are provided.

The method of scanner characterization includes generating a set of patch color values in device-independent color space measured from color patches, scanning the color patches with a scanner generating values representing the patch color averages in scanner device-dependent color space, performing a hierarchical subdivision of device-dependent color space into sub-regions, the sub-regions being defined by cutting planes dividing the patch color values perpendicular to principal axes, and generating a color transformation matrix establishing the relationship between the scanner device-dependent color space and the device-independent color space for each sub-region of device-dependent color space using the patch color values and a weighting function for each matrix, each weighting function giving a weight to each patch color value which is a function of the location of the patch color value.

The method of scanner characterization includes generating a set of patch color values in device-independent color space measured from color patches, scanning the color patches with a scanner generating values representing the patch color averages in scanner device-dependent color space, performing a hierarchical subdivision of device-dependent color space into sub-regions, the sub-regions being defined by cutting planes dividing the patch color values perpendicular to principal axes, and generating a color transformation matrix establishing the relationship between the scanner device-dependent color space and the device-independent color space for each sub-region of device-dependent color space using the patch color values and a weighting function for each matrix, each weighting function giving a weight to each patch color value which is a function of the location of the patch color value.

The system for scanner characterization includes a scanner scanning a plurality of color patches generating values representing patch color averages in scanner device-dependent color space, and a processor receiving a set of patch color values in device-independent color space measured from color patches, the processor performing a hierarchical subdivision of device-dependent color space into sub-regions, the sub-regions being defined by cutting planes dividing the patch color values perpendicular to principal axes and generating a color transformation matrix establishing the relationship between the scanner device-dependent color space and the device-independent color space for each sub-region of device-dependent color space using the patch color values and a weighting function for each matrix, each weighting function giving a weight to each patch color value which is a function of the location of the patch color value.

DETAILED DESCRIPTION

Figure 1:
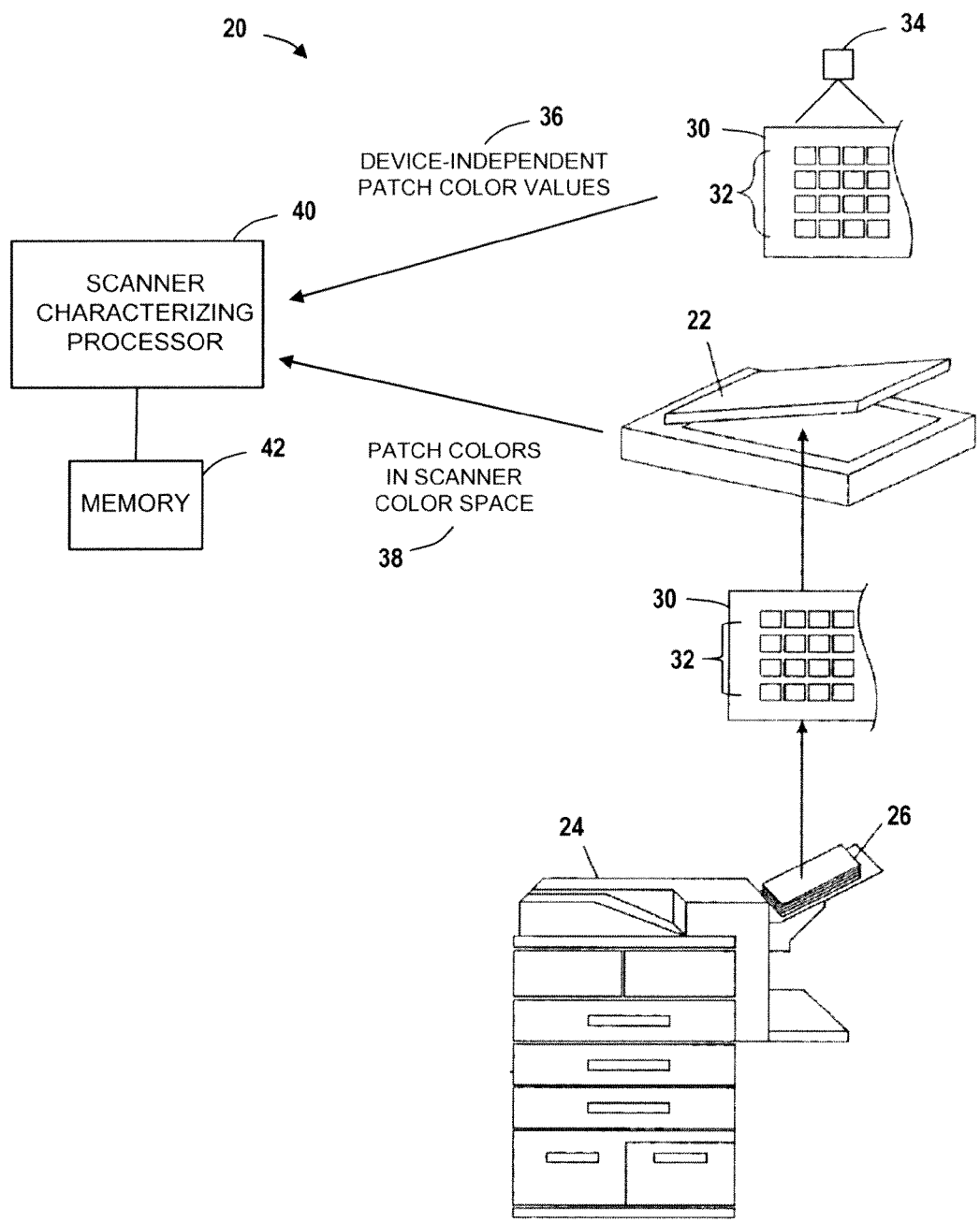
FIG. 1 is block diagram of a system for scanner characterization as described herein.

With reference to FIG. 1, a schematic block diagram is shown with an embodiment of a system of scanner characterization shown generally at 20. System 20 including supporting software and hardware, is adapted to perform color image quality analysis or color calibration or characterization of a scanner 22. System 20 can include an image output terminal, such as a printer 24 having output station 26 that generates a hardcopy color image output 30 of color scanner characterization targets, also known as color patches 32, of varying primary colorants. This arrangement can be useful for calibrating the image output terminal 24, if so desired. Alternatively, the color patches 32 can be pre-generated color image test patches having known color values.

The scanner 22 in system 20 is characterized so that the device signals recorded by the scanner are mapped to a standard, preferably device independent color representation. The scanner characterization system 20 further includes a processor 40 for performing the hierarchal subdivision of color space and generation of color transformation matrices establishing the relationship between the scanner device dependent color space and device-independent color space as described in further detail below. In one embodiment which should not be considered limiting, the scanner 22 is characterized for color measurement of printed hardcopy by scanning the color patches 32 to generate and store a representation of the patches in RGB color space, and in conjunction with measured color data for the test target patches, in a first color space (e.g., CIELAB), the scanner characterizing processor 40 generates a scanner characterization transform which can be stored in memory 42 for mapping from the RGB color space to the first color space.

Figure 2:
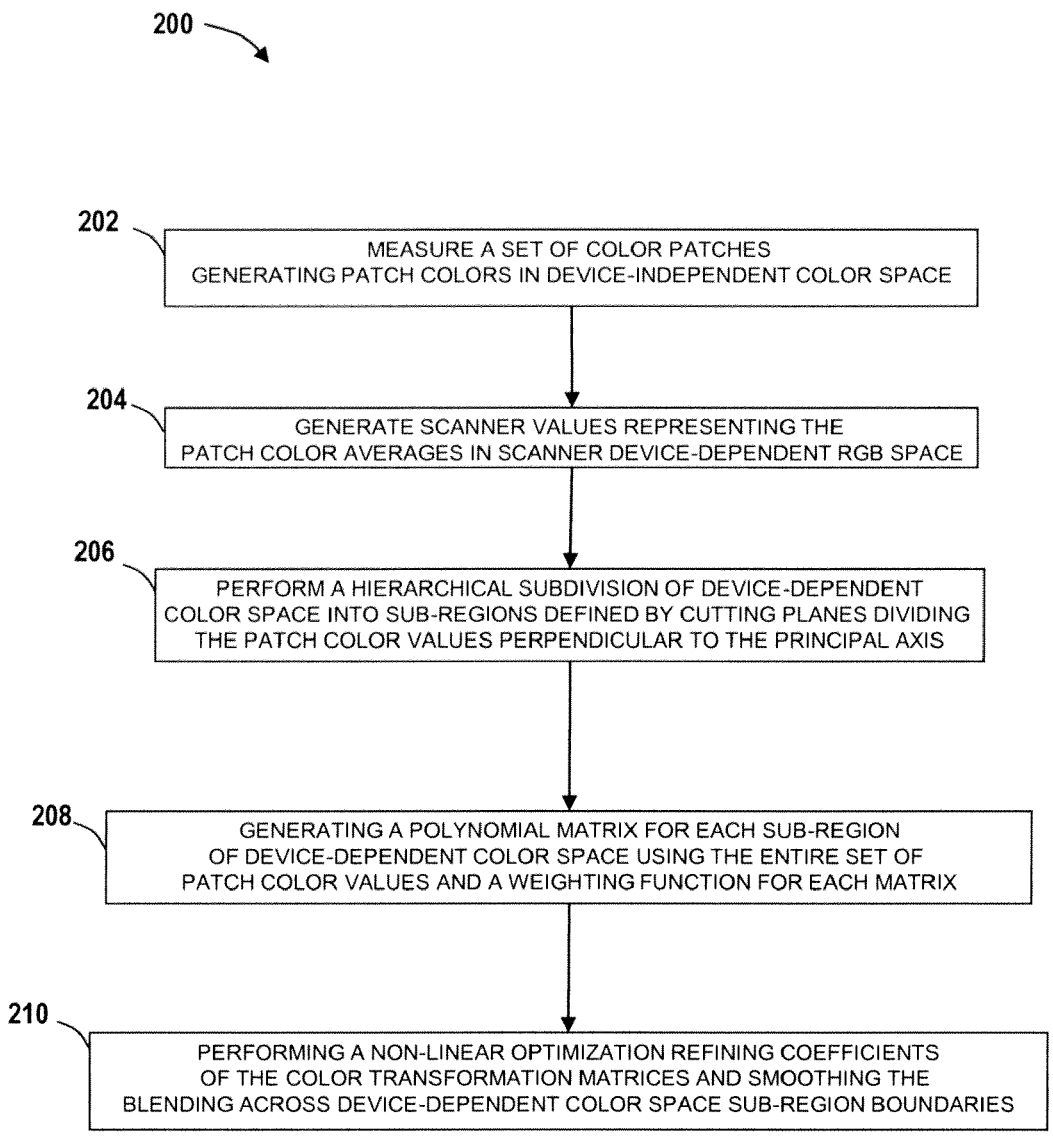
FIG. 2 illustrates a method of scanner characterization as described herein.

Referring now to FIG. 2, a method of scanner characterization using a hierarchical subdivision of color space and a weighting function to build multiple polynomial matrices representing the conversion from RGB for one particular printer's toner set to colorimetric XYZ is shown generally at 200.

Figure 3:
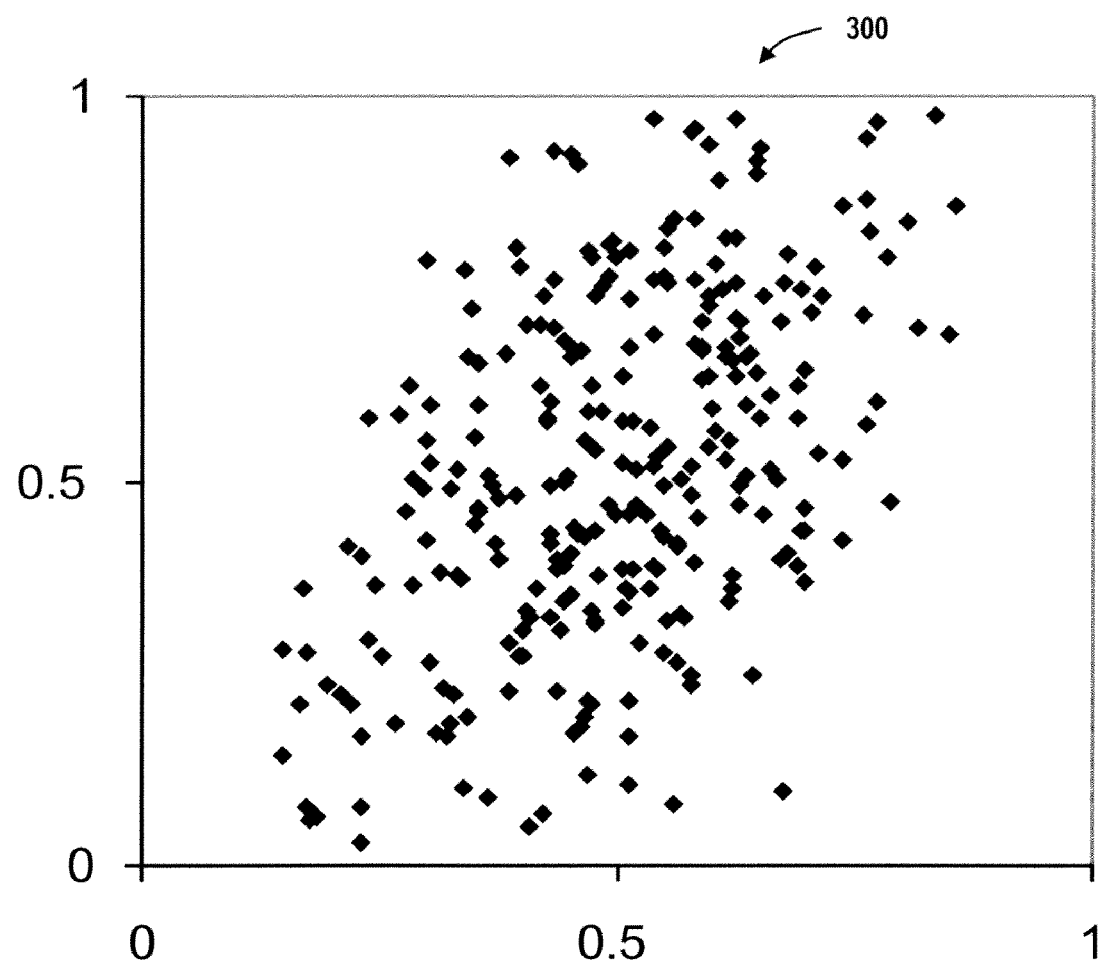
FIG. 3 illustrates colorimetric XYZ values representing the measured patch color values of each color patch as described herein.

The method includes measuring a set of color patches 32 generating a set of patch color values 36 in device-independent color space at 202. The color patches can be measured by a spectrophotometer 34 to generate colorimetric XYZ values representing the patch color values of each color patch, such as is shown at 300 in FIG. 3. For the purposes of example and not for limiting same, CIE L*a*b* space was used as the device-independent color space, though other color spaces can be used, such as for example CIE L*u*v*. The patch color values are provided to the scanner characterizing processor 40.

The method 200 further includes scanning each color patch 32 and generating scanner values 38 representing the patch color averages in scanner RGB space at 204. The scanner values are provided to the scanner characterizing processor 40.

The color patches 32 can be generated by printing on the color printer 24 that the scanner is subsequently intended to measure, though other color printers can be used. If the color patches are printed in 4 color (cyan, magenta, yellow, and black) CMYK, the Under Color Removal/Gray Component Replacement (UCR/GCR) scheme can be already fixed and thus the same at the time these characterization patches 32 are printed as when the scanner 24 is used to measure the printed colors and the derived conversion is desired. If the colors are printed in 3 color CMY, three component RGB is adequate to characterize their color.

The method 200 also includes performing a hierarchical subdivision of the device-dependent color space into sub-regions, the sub-regions being defined by cutting planes dividing the patch color values perpendicular to a principal axis at 206 using processor 40.

Figure 4:
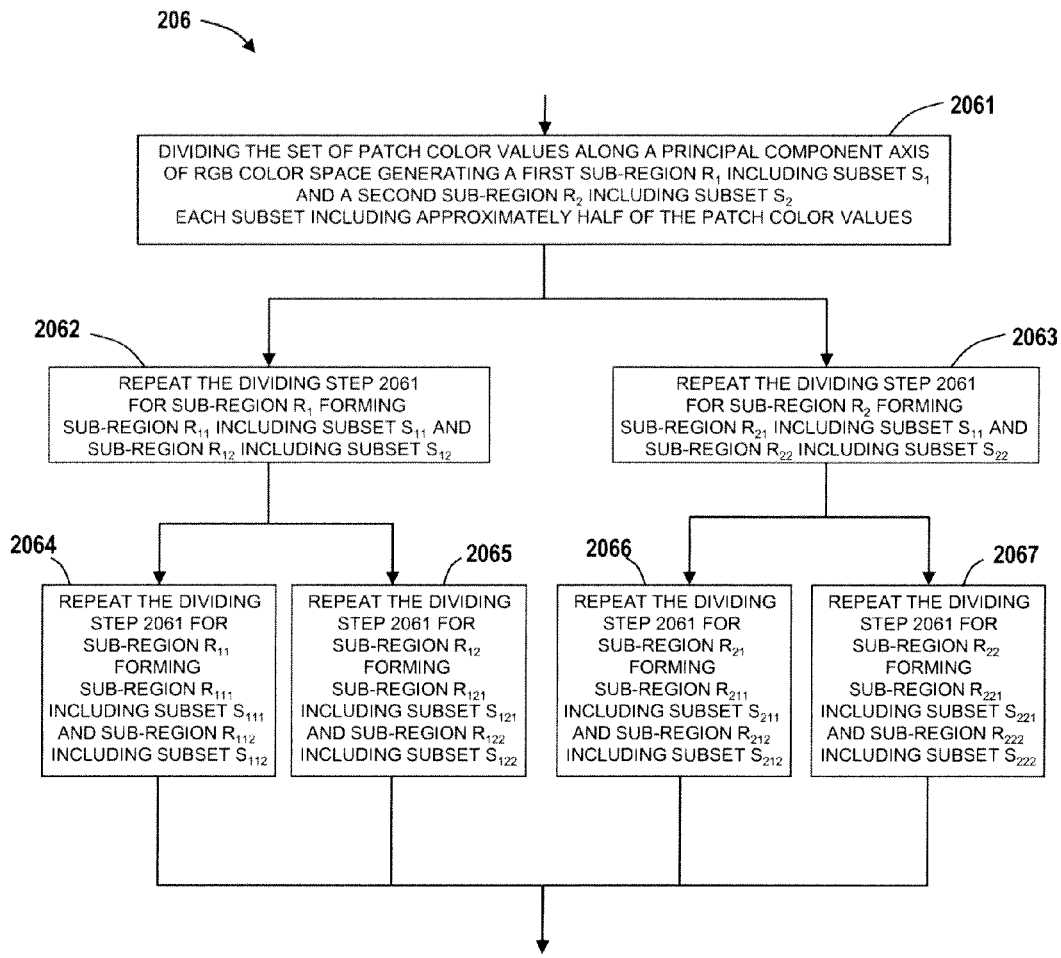
FIG. 4 illustrates further details of recursively performing a hierarchal subdivision of device-dependent color space.

Referring now to FIG. 4, the hierarchical subdivision of color space at 206 is shown in greater detail. The set of patch color values 300 generated at 202 are divided into groups, or subsets, by recursively splitting the RGB color space into smaller and smaller sub-regions along the principal component axes of the corresponding patch color subsets. To begin this recursive splitting, the entire set of patch color values is divided along the first principal component axis of the complete set of patch colors represented in the device-dependent color space, at 2061, generating a first sub-region $R_1$ including a first subset $S_1$ of the patch color values and a second sub-region $R_2$ including a second subset $S_2$ of the patch color values. Step 2061 is repeated, recursively, for each sub-region and its corresponding subset of RGB color space values as shown in steps 2062-2067 to a depth of 3, though other depths can be used.

Figure 5:
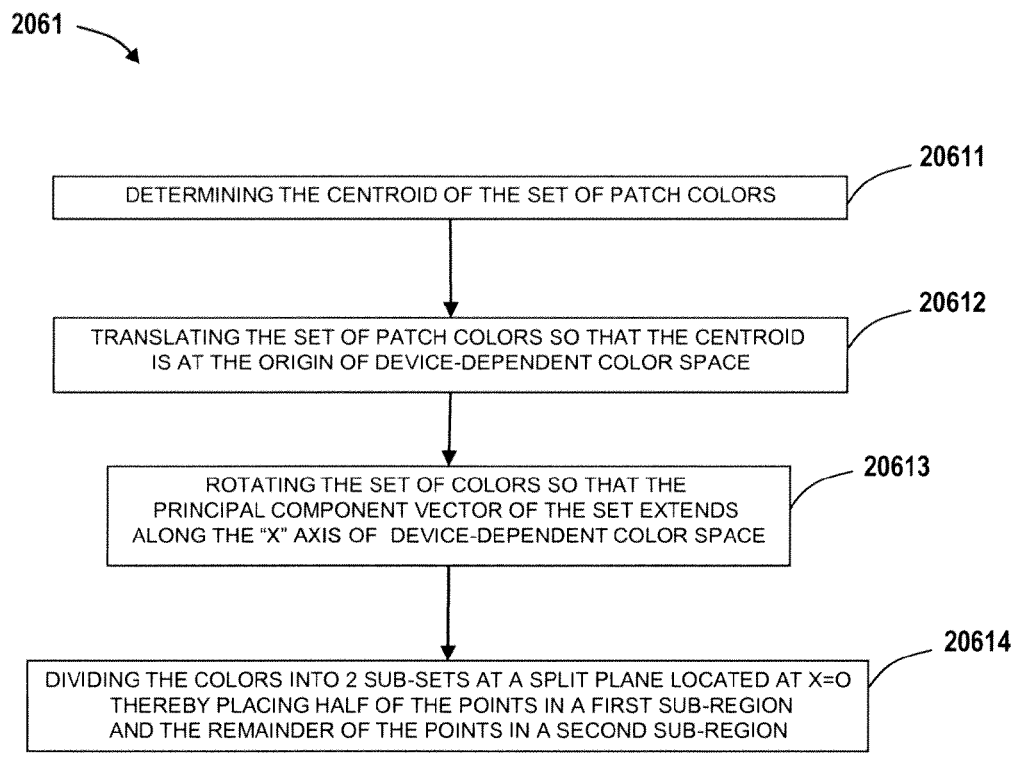
FIG. 5 illustrates further details of dividing a set of patch colors along its principal component axis in device-dependent color space to generate sub-regions each including a subset of patch color values.

Referring now to FIG. 5, the dividing step 2061 is shown in further detail. It includes determining the centroid of the set of patch color values in the RGB color space at 20611. In the first recursion, the centroid of the entire set of patch color values 300 is determined. The centroid may be calculated using the well-known formula: $C=\Sigma c_i/N$
where $c_i$ gives the color coordinates of the ith of N patch color values.

Figure 6:
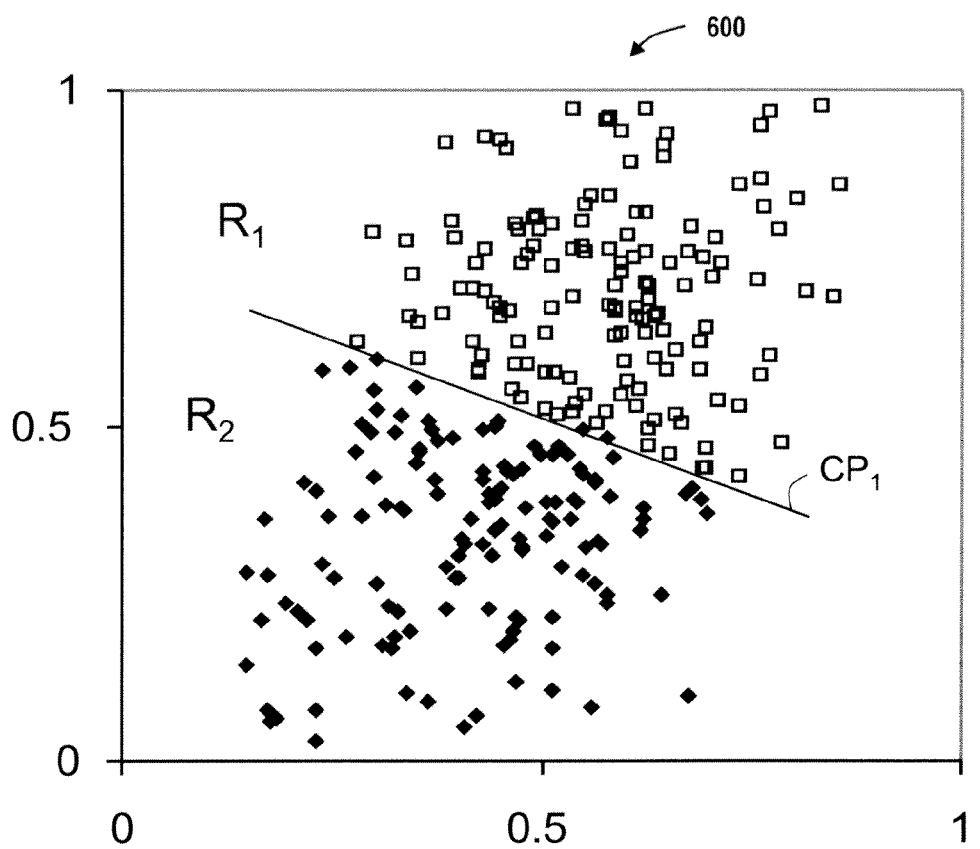
FIG. 6 illustrates the results, in 2 dimensions, of the first split at the first cut obtained at 2061.

The set of colors is then translated at 20612 in the device-dependent color space so that the centroid of the set is relocated at the origin of the device-dependent color space. Next, the entire set of patch color values is rotated at 20613 so that the principal component vector extending through the set extends along the "x" axis of the device-dependent color space. The set of patch color values is then divided into 2 sets, a first subset $S_1$ and a second subset $S_2$, by dividing the color space into 2 different regions at a cut plane ($CP_1$), also known as a split plane, defined by the plane X=0 in the color space. The first region $R_1$ being defined on one side of $CP_1$ and the second region $R_2$ being defined on the other side of the cut plane. The first subset $S_1$ contains the patch color values in the first region $R_1$, and the second subset $S_2$ contains the patch color values in the second region $R_2$. Approximately half of the patch color values are contained in each subset $S_1$ and $S_2$. The result of the first split at $CP_1$ obtained at 2061 is shown in 2 dimensions at 600 in FIG. 6, generating a first sub-region $R_1$ containing the subset $S_1$ of patch color values illustrated by the filled diamonds, and a second sub-region $R_2$ containing the subset $S_2$ of patch color values illustrated by the open squares.

Figure 7:
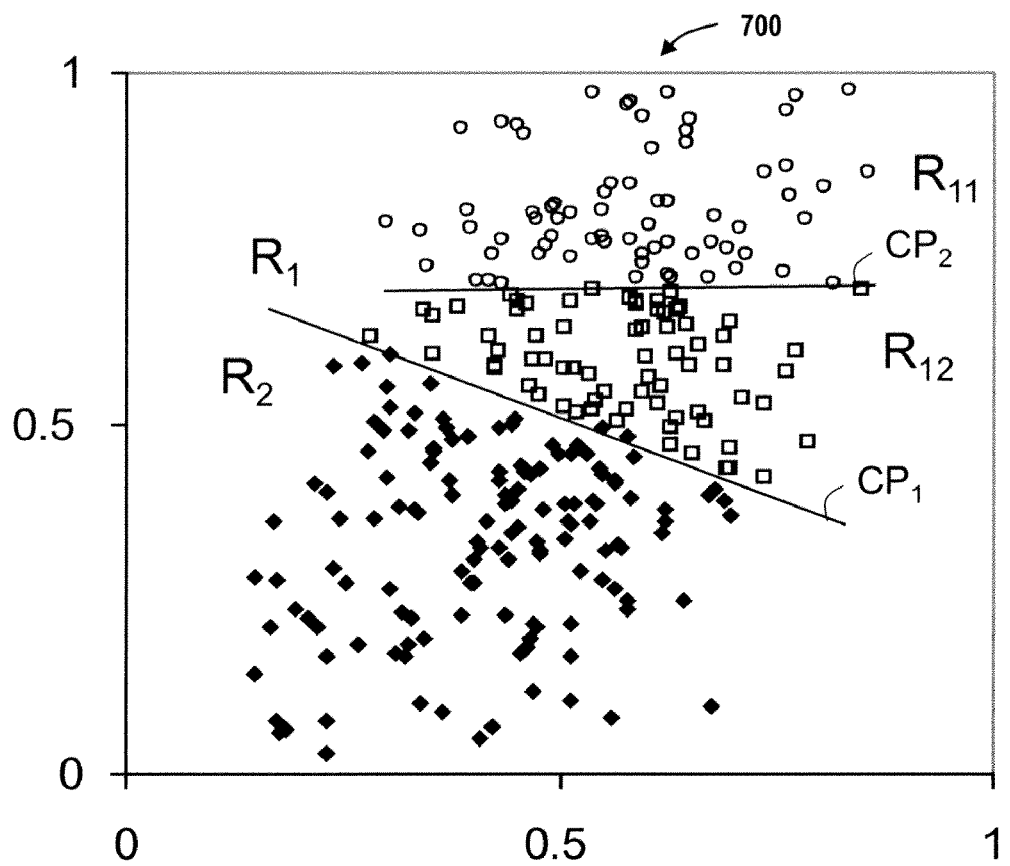
FIG. 7 illustrates the results, in 2 dimensions, of a second round of dividing the color space region at a second cut plane obtained at 2062.

The patch color values are divided further by recursively repeating the dividing at 2061 for each subset of patch color values that have been created previously. For example, in step 2062, the first subset of patch color points $S_1$ contained in the first region $R_1$ is divided in two by repeating steps 20611, 20612, 20613 and 20614, dividing the first region $R_1$ (containing subset $S_1$) into region $R_{11}$ containing subset $S_{11}$, and region $R_{12}$ containing subset $S_{12}$. Approximately half of the patch color values in subset $S_1$ are contained in each subset $S_{11}$ and $S_{12}$. The results of this second round of dividing the color space region at $CP_2$ obtained at 2062 are shown in 2 dimensions at 700 in FIG. 7, where the subset $S_{11}$ in region $R_{11}$ contains the patch color values illustrated by the open circles and the subset $S_{12}$ in region $R_{12}$ contains the patch color values illustrated by the open squares.

In step 2063, the second subset of patch color points $S_2$ contained in the second region $R_2$ is divided into two subsets in a similar manner (repeating steps 20611, 20612, 20613 and 20614) dividing the second region into two regions, $R_{21}$ containing subset $S_{21}$, and $R_{22}$ containing subset $S_{22}$.

Figure 8:
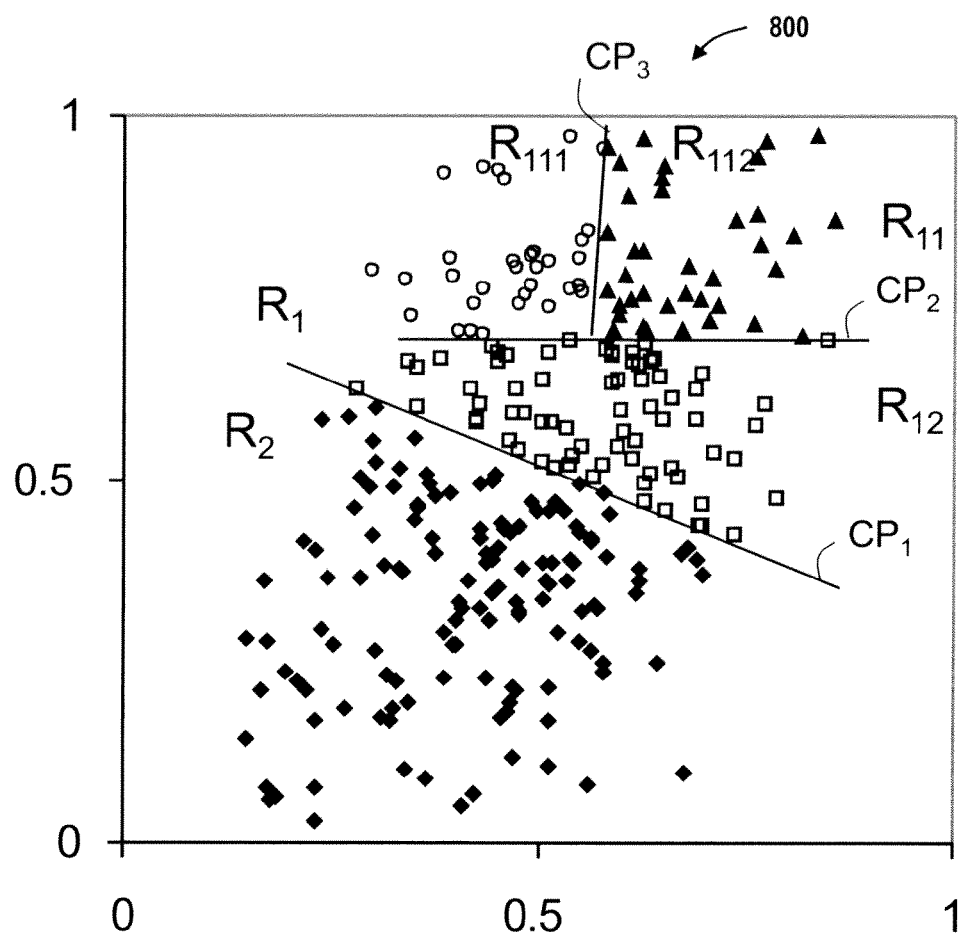
FIG. 8 illustrates the results, in 2 dimensions, of a third round of dividing the color space region at a cut plane obtained at 2064.

This recursion continues at 2064, 2065, 2066 and 2067, to a depth of 3, though other depths could be used. For example, FIG. 8 illustrates the result of step 2064, where the set of patch color values, shown in two dimensions at 800, is split three times. The third cut at $CP_3$ divides the sub-region $R_{11}$ defined by the second cut plane $CP_2$ into two sub-regions, $R_{111}$ containing the patch color values of subset $S_{111}$ including the points on the left of $CP_3$ indicated by open circles, and the sub-region $R_{112}$ containing the patch color values of subset $S_{112}$ including the points on the right of $CP_3$ indicated by the filled triangles. The sub-region $R_{12}$ including the open squares of subset $S_{12}$ will be split again into 2 sub-regions including sub-region $R_{121}$ containing the subset $S_{121}$ (not shown) and sub-region $R_{122}$ containing the subset $S_{122}$ (not shown). The sub-region $R_2$ containing the filled diamonds of sub-set $S_2$, will be split into two sub-regions, sub-region $R_{21}$ containing subset $S_{21}$ and sub-region $R_{22}$ containing subset $S_{22}$, each of which will be split again forming sub-region $R_{211}$ containing subset $S_{211}$ and sub-region $R_{212}$ containing subset $S_{212}$ and sub-region $R_{221}$ containing subset set $S_{221}$ and sub-region $R_{222}$ containing subset $S_{222}$.

Adaptive splitting can be performed depending on the number of points "inside" the group or subset to be potentially split. For example, after splitting, each subset will be used as the primary source of data for a fitting algorithm. If that fitting algorithm requires a number N of points to produce a robust result, a subset may be split only if each of the two resulting subsets will have more than N points.

Referring again to FIG. 2, after recursive splitting is complete, a color transformation matrix is generated by processor 40 for each of the smallest sub-regions of RGB color space $R_{111}$, $R_{112}$, $R_{121}$, $R_{122}$, $R_{211}$, $R_{212}$ $R_{221}$, and $R_{222}$ at 208. The entire set of patch color values is used to generate each transformation matrix and each matrix uses a weighting function giving a weight to each patch color value that is a function of the location of the patch color value.

A number of different matrices have been used in the art for color transformations, especially for scanners. These include 3×3 matrices containing three rows of three values each, which, when multiplied by a three-dimensional input color, produce a three-dimensional output color. Better results have been found with 3×20 matrices, in which the color coordinates and products and powers of the color coordinates are formed into a vector of 20 values, and when that vector is multiplied by the 3×20 matrix a three dimensional output color coordinate results.

For each sub-region, a best fit matrix in XYZ is computed by solving a least squares problem. An approach can be used which is similar to Hardeberg's as described in Acquisition and Reproduction of Colour Images: Colorimetric and Multispectral Approaches, in l'Ecole Nationale Superieure des Telecommunications (Paris 1999) which is hereby incorporated by reference herein in its entirety. A cubic matrix mapping RGB to XYZ is generated, and then a mapping of XYZ to L*a*b* using a standard method is performed. The matrix is derived slightly differently. First, all L*a*b* measurements are converted to CIEXYZ, and all RGB values are mapped into a vector including all products of all powers of RGB (including 0), such that the sum of the exponents is less than or equal to 3. Thus terms include 1, B, $B^2$, $B^3$, G, GB, $GB^2$, $G^2$, $G^2B$, $G^3$, R, RB, $RB^2$, RG, RGB, $RG^2$, $R^2$, $R^2B$, $R^2G$ and $R^3$. That is, the vector is given by:

$$[1\ B\ B^2\ B^3\ G\ GB\ GB^2\ G^2\ G^2B\ G^3\ R\ RB\ RB^2\ RG\ RGB\ RG^2\ R^2\ R^2B\ R^2G\ R^3]$$

An initial matrix is formed by converting all input RGB triples into a vector of the above 20 terms, and converting all input L*a*b* values to XYZ triples. These are then used as input to a conventional least squares solver to obtain a matrix containing sixty elements (20×3), which gives the best conversion in terms of XYZ error. Specifically, three vectors are found, one of which is the solution for the matrix problem in which the series of powers of RGB form the matrix, and the right hand side is the series of X values, and similarly the other two are found for the series of Y values and Z values. This can be handled by a commonly used Singular Value Decomposition (SVD)-based approach as is well known in the art of data fitting.

Once the first matrix has been found, each of the three vectors making it up is further examined by evaluating the statistical significance of each of the elements. The least significant element is zeroed, and the solution re-built. This is continued until all elements have p-values less than 0.1. Dropping only one term at a time (i.e. in each iteration) is in line with the fact that the p-values are only correct estimates of the significance of the terms, given that all others are included. This produces a reduced matrix having zeroes for all the insignificant terms, and a good estimate of each of the remaining terms.

The matrices are computed using weighted least squares fitting using all the input data points. These matrices are built to minimize the weighted sum of squared errors between the XYZ values of the patch color values and the RGB values of the input points generated at 204, with larger weights used for the XYZ values contained within the region. The weight of any particular XYZ value is the product of the weights that point receives relative to the shortest distances $d_n$ (where n is the particular cut plane) to each of the corresponding cut planes $CP_n$ ($CP_1$, $CP_2$ or $CP_3$) used in defining the region being fit. Preferably the weight is a maximum value (such as 1) for points within the sub-region, and falls rapidly with distance beyond the cut plane for points outside of that sub-region.

Using the data of FIG. 8 as an example, consider the matrix for the sub-region $R_{112}$ corresponding to the filled triangles in subset $S_{112}$. The XYZ values in the subset $S_{112}$ are given a weight of 1. The XYZ values in the subset $S_{111}$ shown as open circles, are given weights which are a function of $d_3$ (i.e. $f(d_3)$), where $d_3$ is the shortest distance from the $3^{rd}$ cut plane ($CP_3$) to the point in question. The points in sub-region $R_{12}$ including the set of open squares of $S_2$, have two cases. A first group of the these points are on the same side of the 3rd cut plane ($CP_3$) as the filled triangles, but they are on the other side of the 2nd cut plane ($CP_2$) from those in region $R_{112}$. The points in this subset are given weights which are a function of $d_2$, where $d_2$ is the distance from the point to the 2nd cut plane ($CP_2$). A second group of these points are on the other side of both cut planes ($CP_2$ and $CP_3$). The points in this second group are given weights which are a product of functions of $d_3$ and $d_2$. Thus, during this recursion the current weight for each point is passed on, and points receiving a weight of 1 just retain their previous weight, whereas points receiving a lower weight (less than 1) have their weights reduced accordingly when multiplied by their previous weight.

Figure 9:
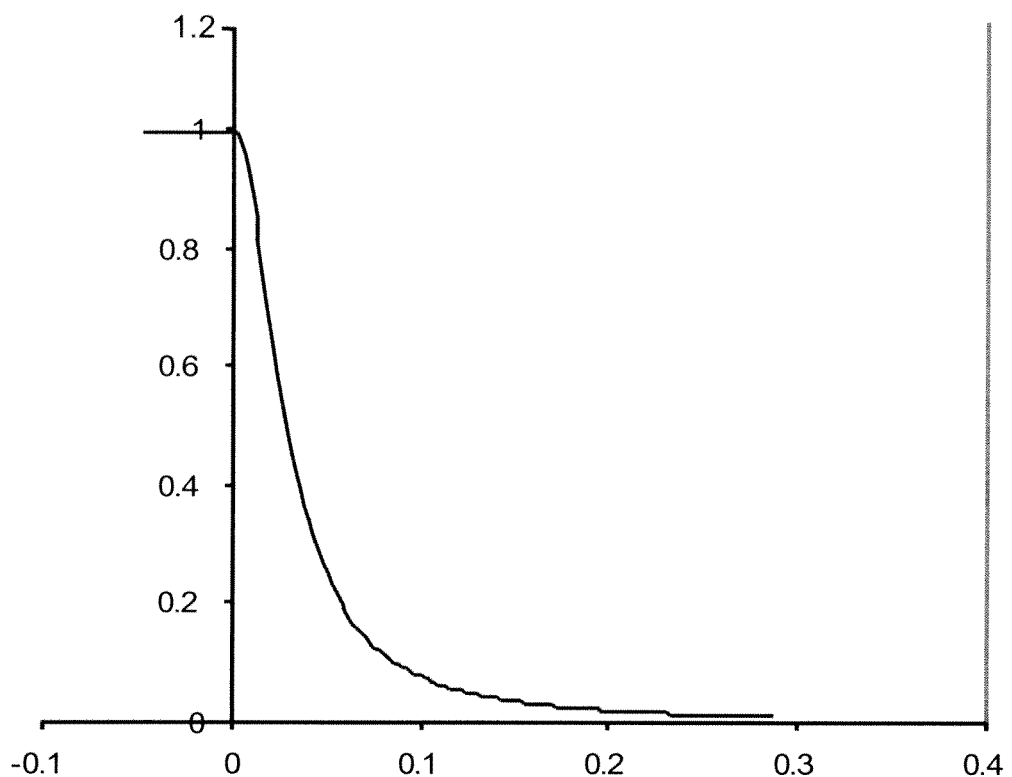
FIG. 9 illustrates an example of a weighting function given to each subset of XYZ color values as described herein.

A function is used for $f(d_n)$. Referring to FIG. 9, a function that has been found to work well is $1/(1+kd_n^2)$, where k is a parameter that depends on the units of d. With d running from 0 to 1, a good value of k has been found to be 1200. The intent of the weighting function is to have a form that is 1 at 0, (to match the constant value of 1 for points on the other side of the boundary), has 0 derivative at 0 (for a smooth transition), and drops rapidly with increasing d. With this value of the parameter, it drops to 0.1 at d~0.09, and 0.01 at d~0.288.

A final optimization using the reduced matrix is then performed at 210, using a conjugate gradient approach, to find improved values of the remaining significant terms. It uses an error metric that depends on $\Delta E$ in $L^*a^*b^*$ space. Because $L^*a^*b^*$ is non-linear in both XYZ and in RGB, a non-linear optimizer can be used to produce a superior result, although a linear solution is close to optimal. Conjugate gradient is a non-linear optimizer, and, like many non-linear optimizers, it performs best when given a good starting guess. In this case the linear solution provides a good starting guess. A non-linear solver requires as one of its inputs, an objective function, which operates on the input data and the intermediate solution to compute a "quality" of the current intermediate solution. Commonly the objective function is a sum of squared errors. In the case of optimizing in $L^*a^*b^*$ space, the objective function can be the sum of the color differences between the measured values and the fit values at the measured locations. Here the color differences can use the Euclidean difference (DE) or a more sophisticated color difference metric such as DE2000.

Both stages, the linear and the non-linear, can be done weighted. SVD-based solvers, as are commonly known in the art, can take weights and the non-linear optimization is weighted if the calculation of the objective function uses the weights. That is, instead of using the sum of the color differences, it uses the sum of weighted color differences. The weights of the color differences can be based on the weighting function described above.

Just as every input color is weighted and included in every matrix calculation, every matrix is weighted and included in every color conversion. That is, given a point p, for which we wish to find a converted value, we use a weighted sum of all of the values that would be obtained by converting p using all of the matrices. The weights used in the weighted sum are calculated in the same way that the weights would be calculated if p were being used to build the corresponding matrix. That is, when computing a matrix $M_R$ corresponding to a sub-region R, p would be weighted with respect to all the cutting planes that define R, giving a total weight to p of $W_R$. Instead, $M_R$ is weighted with $W_R$. The final converted value for p is the result of computing a converted color $c_R$ for each region R, based on the matrix $M_R$. Then the sum $$S = \Sigma c_R W_R / \Sigma W_R$$

is used as the converted value.

To re-iterate, given a color to convert, and a matrix to use, the matrix is weighted in the same way that the color would be weighted when calculating that matrix. The color is converted using each of the matrices, and the results are weighted by the corresponding weights to give the final converted color. Because there is only a small number of matrices, this is reasonably fast. If it is insufficiently fast for some application, the results of a large number of conversions can be pre-computed and stored in a lookup table in memory 42.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of scanner characterization comprising:
   generating a set of patch color values in device-independent color space measured from color patches;
   scanning the color patches with a scanner generating values representing the patch color averages in scanner device-dependent color space;
   performing a hierarchical subdivision of device-dependent color space into sub-regions, the sub-regions being defined by cutting planes dividing the patch color values perpendicular to principal axes; and
   generating a color transformation matrix establishing the relationship between the scanner device-dependent color space and the device-independent color space for each sub-region of device-dependent color space using the patch color values and a weighting function for each matrix, each weighting function giving a weight to each patch color value which is a function of the location of the patch color value.

2. The method of claim 1 wherein a patch color value weight in a sub-region is the product of its weight in a parent region and a weight function based on a distance from the cutting plane defining the sub-region.

3. The method of claim 2 wherein the weighting function=1 for patch color values inside the sub-region and=$1/(1+kd_n^2)$ for patch color values outside the sub-region, where $d_n$ is the distance of each patch color value outside of the sub-region to the cutting planes $CP_n$ defining the sub-region and k is a parameter that depends on the units of d.

4. The method of claim 1 further comprising performing a non-linear optimization refining coefficients of the color transformation matrix and smoothing the blending across device-dependent color space sub-region boundaries.

5. The method of claim 1 wherein scanner color device-dependent space is RBG color space.

6. The method of claim 1 wherein the device—independent-color space is CIEXYZ color space.

7. The method of claim 1 wherein the device-independent-color space is CIE $L^*a^*b^*$ color space.

8. The method of claim 1 wherein the device-independent-color space is CIE L*u*v*color space.

9. The method of claim 1 wherein color transformation matrices are polynomial color transformation matrices.

10. The method of claim 1 wherein each polynomial color transformation matrix is built to minimize the weighted sum of squared errors between the color patch values and the corresponding RGB values.

11. A system for scanner characterization comprising:

a scanner scanning a plurality of color patches generating values representing patch color averages in scanner color space;

a processor receiving a set of patch color values in device-independent color space measured from color patches, the processor performing a hierarchical subdivision of device-dependent color space into sub-regions, the sub-regions being defined by cutting planes dividing the patch color values perpendicular to principal axes and generating a color transformation matrix establishing the relationship between the scanner device-dependent color space and the device-independent color space for each sub-region of device-dependent color space using the patch color values and a weighting function for each matrix, each weighting function giving a weight to each patch color value which is a function of the location of the patch color value.

12. The system of claim 11 a patch color value weight in a sub-region is the product of its weight in a parent region and a weight function based on a distance from the cutting plane defining the sub-region.

13. The system of claim 12 wherein the weighting function=1 for patch color values inside the sub-region and=$1/(1+kd_n^2)$ for patch color values outside the sub-region, where $d_n$ is the distance of each patch color value outside of the sub-region to the cutting planes $CP_n$ defining the sub-region and k is a parameter that depends on the units of d.

14. The system of claim 11 further comprising performing a non-linear optimization refining coefficients of the color transformation matrix and smoothing the blending across device-dependent color space sub-region boundaries.

15. The system of claim 11 wherein scanner device-dependent color space is RBG color space.

16. The system of claim 11 wherein the device-independent-color space is CIEXYZ color space.

17. The system of claim 11 wherein the device-independent-color space is CIE L*a*b*color space.

18. The system of claim 11 wherein the device-independent-color space is CIE L*u*v*color space.

19. The system of claim 11 wherein color transformation matrices are polynomial color transformation matrices.

20. The system of claim 11 wherein each polynomial color transformation matrix is built to minimize the weighted sum of squared errors between the color patch values and the corresponding RGB values.

* * * * *